United States Patent
Hedden

(10) Patent No.: US 7,027,402 B2
(45) Date of Patent: Apr. 11, 2006

(54) DIGITAL SIGNAL ROUTE DETERMINATION METHOD

(75) Inventor: Ralph Coleman Hedden, Sandia Park, NM (US)

(73) Assignee: Honeywell International Inc., Morristown, NJ (US)

( * ) Notice: Subject to any disclaimer, the term of this patent is extended or adjusted under 35 U.S.C. 154(b) by 438 days.

(21) Appl. No.: 09/732,674

(22) Filed: Dec. 8, 2000

(65) Prior Publication Data

US 2002/0071542 A1    Jun. 13, 2002

(51) Int. Cl.
    *H04L 12/26*    (2006.01)
(52) U.S. Cl. ............... 370/238; 370/235; 370/229; 709/239; 709/240
(58) Field of Classification Search ........ 370/230–238, 370/420, 351, 252, 401, 463, 419, 389, 392; 379/221.02
    See application file for complete search history.

(56) References Cited

U.S. PATENT DOCUMENTS

| | | | | |
|---|---|---|---|---|
| 5,337,352 A | * | 8/1994 | Kobayashi et al. | 379/234 |
| 5,432,776 A | * | 7/1995 | Harper | 370/252 |
| 5,459,837 A | | 10/1995 | Caccavale | |
| 5,712,907 A | * | 1/1998 | Wegner et al. | 379/114.02 |
| 5,898,668 A | * | 4/1999 | Shaffer | 370/230 |
| 5,933,425 A | * | 8/1999 | Iwata | 370/351 |
| 6,006,264 A | * | 12/1999 | Colby et al. | 709/226 |
| 6,111,673 A | * | 8/2000 | Chang et al. | 398/79 |
| 6,144,641 A | * | 11/2000 | Kaplan et al. | 370/238 |
| 6,181,699 B1 | * | 1/2001 | Crinion et al. | 370/392 |
| 6,525,851 B1 | * | 2/2003 | Chang et al. | 398/166 |
| 6,775,267 B1 | * | 8/2004 | Kung et al. | 370/352 |
| 2002/0062372 A1 | * | 5/2002 | Hong et al. | 709/225 |
| 2003/0043796 A1 | * | 3/2003 | Okuyama et al. | 370/389 |

FOREIGN PATENT DOCUMENTS

EP      0 942 554 A     9/1999

OTHER PUBLICATIONS

International Search Report, Apr. 15, 2003; PCT/US 01/47296.

* cited by examiner

*Primary Examiner*—Seema S. Rao
*Assistant Examiner*—Michael J. Moore
(74) *Attorney, Agent, or Firm*—Kurt Luther; Dennis F. Armijo

(57) ABSTRACT

In a method of routing digital signals based on criteria defined by the user all messages receive a prioritization based on the criteria defined by the individual user. Based on this guidance, each digital message is Tagged so that Overlay software can determine the prioritization that will be applied to the message and subsequently which media or route will be used and when a message should be sent. The Overlay software uses embedded look-up tables, which define available routes so that prioritization decisions can be made, real-time, based on route status or cost, and prioritization algorithms or a combination of both to determine the most appropriate media or route to send a message. The Overlay software also counts each message, the route used, and the time sent to enable accounting verification at an appropriate time in the future.

18 Claims, 4 Drawing Sheets

DIGITAL SIGNAL ROUTE DETERMINATION METHOD

FIELD OF HE INVENTION

The invention relates to digital signal routing and more particularly to a method of choosing a Digital or Datalink Service Provider (DSP) based on factors unique to the user.

BACKGROUND OF THE INVENTION

Currently in the aviation industry, the state of the art for providing a DSP consists of installing software in various pieces of equipment that sends the message solely to the service provider who holds the contract for that user. All messages are then sent through that provider regardless of any priorities associated with the message and without considering any other competing service that might be available. This software normally resides in a Communications Management Unit (CMU) in aircraft and in some type of communications router for ground side operations. The software directs all messages to be sent over a single digital service provider network. The digital signal routing decisions are made almost solely on the basis of which Digital Service Provider (DSP) a user chooses to contract with as shown in FIG. 1. Historically, this has been sufficient since there was minimal overlap in services, limited competition, and a relatively limited number of digital messages. All of these paradigms are changing and the limited number of digital service providers is increasing. As the number of messages increases, the competition will increase. This will cause a definite change in the availability of choices. Not only will there be additional competitors, but eventually the two major DSPs will have significant overlap of capabilities and service, certainly from a geographic perspective. This overlap, as well as the introduction of new providers, will enable a dramatic increase in competition for those DSPs that can distinguish their offering and provide analysis of information for the user, leading to various user advantages at any given time. This increase in competition creates a need for real time or near-real time ability to choose or change the route by which a digital message travels to maximize the economic advantage of one route over another. Another failing of the current system is that it does not consider that some messages require special handling. It is possible that a given user may place a higher value on security or latency or even the guaranteed integrity of the message rather than mere expediency.

The present state of the art is the ARINC system located at a netsite at dominium.com/message.html, which discloses a system that only uses a single provider and is not prioritized by any factors. The system teaches a ground transportation product and uses one network unless it is out of range and then allows the user to choose a satellite media if the message is a priority. It can be programmed to default to this option for certain messages if desired. Neither of these methods continually considers several factors and multiple routes when available before choosing the most appropriate route based on the customer's criteria.

U.S. Pat. No. 5,570,417 discloses a system that is focused on fixed, ground-based telecommunications infrastructure. In addition, it assumes a model whereby the rate structures are fixed, based on a predetermined route. It also assumes a fixed initiation and receiving point as opposed to one or more of those points being dynamic.

U.S. Pat. No. 5,661,792 also discloses a fixed, ground-based telecommunications infrastructure. As with Pat. No. 5,570,417, it assumes a model whereby the rate structures are fixed, based on a predetermined route. It considers reliability but only from the perspective that should the primary carrier be unavailable, the database will identify an alternate carrier.

To date, there have been no new proposed solutions to deal with this problem. In the current aeronautical business model as shown in FIG. 1, current user discussions continue to focus on negotiating optimal rates with one DSP. If a user contracts with only one DSP and then uses another DSP's service, due to lack of regional service for example, the existing structure assumes the receiving DSP will deliver the message and bill the DSP which has a contract with the user. The DSP holding a contract with the specific customer will then turn around and bill the customer for the service along with additional handling charges. Even though some users contract with more than one DSP, this is done primarily with the intent to use a specific DSP within specific regions of the world. With software installed in the CMU when an aircraft is purchased or when a contract is negotiated, there is no way to effect economics, security, latency or quality on a real-time basis. A user is forced to use the sole source message route a DSP provides.

There are some existing digital service communications (though not in aviation) that have introduced some portion of economics into this problem. These existing ground solutions typically hold a message until lower cost service is available. In actuality, this method only holds the message until contracted service is available which avoids the double fee charging as discussed above. The basis of the economic advantage is that holding the message until contracted service is available will ensure lower cost service.

However, none of the prior art devices introduce multiple priorities into the decision making process, enabling the user, or initiator, to gain this significant benefit.

SUMMARY OF THE INVENTION

My invention defines a method of providing the user with the ability to choose various digital message routes based on his particular needs at any given time. My method for Digital Signal Route Determination (DSRD) addresses the short comings of the prior art by installation of overlay software anywhere a message is initiated, whether that is on a vehicle, user initiation facility, or government control facility. Overlay software is envisioned simply as software added to existing equipment that does not interfere with current processing in any way, and only acts to filter the digital message to understand its unique routing needs and subsequently to direct the message to the appropriate route. This software is capable of choosing:

the most economic route;
    the most secure route if required;
    the fastest (latency) route if required; and/or
    the route that affords the highest integrity.

An aspect of this invention is that it combines multiple priorities, sorts the data according to programmed information from the customer, and makes a decision based on that information. In addition, this information can be updated near or near-real time as required depending on the application.

A primary object of the present invention is to provide a user with a choice of a DSP provider based on criteria and priorities selected by the user.

Another object of the present invention is to provide a user with a cost effective selection process for a DSP provider.

Yet another object of the present invention is to enable a level of competition, leveraging growth in overlapping services, that does not exist today.

A primary advantage of the present invention is that the invention can be sold as a service to reduce cost for a user, increase the user's efficiency, and enhance security. It can be used by any participant in the aerospace community that sends or receives digital messages.

Another advantage of the present invention is the ability of the user to choose a DSP depending on the user's criteria.

Yet another advantage of the present invention is that the user can prioritize his criteria for the appropriate output from the invention.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF DESCRIPTION OF THE DRAWINGS

The accompanying drawings, which are incorporated into and form a part of the specification, depict several illustrative of the present invention and, together with the description, serve to explain the principles of the invention. The drawings are only for the purpose of illustrating a preferred embodiment of the invention and are not to be construed as limiting the invention. In the drawings.

DETAILED DESCRIPTION

The present invention leverages competing digital communications services in a way that will allow benefit to incur to the user. The invention identifies various priorities associated with a given digital message, tags this priority to the message, and subsequently uses this information to control the media choice and/or the route within a media. By enabling a priority system, the user will be able to effect the economics of sending a message, or increase the security, increase the speed of delivery, or guarantee a certain level of quality/integrity for the digital message. Each of these factors are prioritized and chosen by the user.

Figure 1:
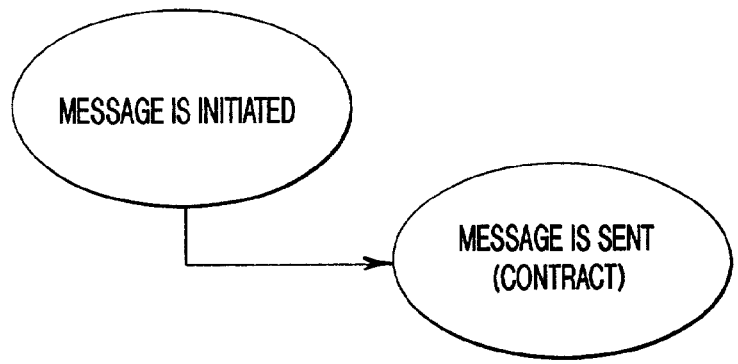
FIG. 1 shows the existing prior art model for digital signal routing.
Figure 2:
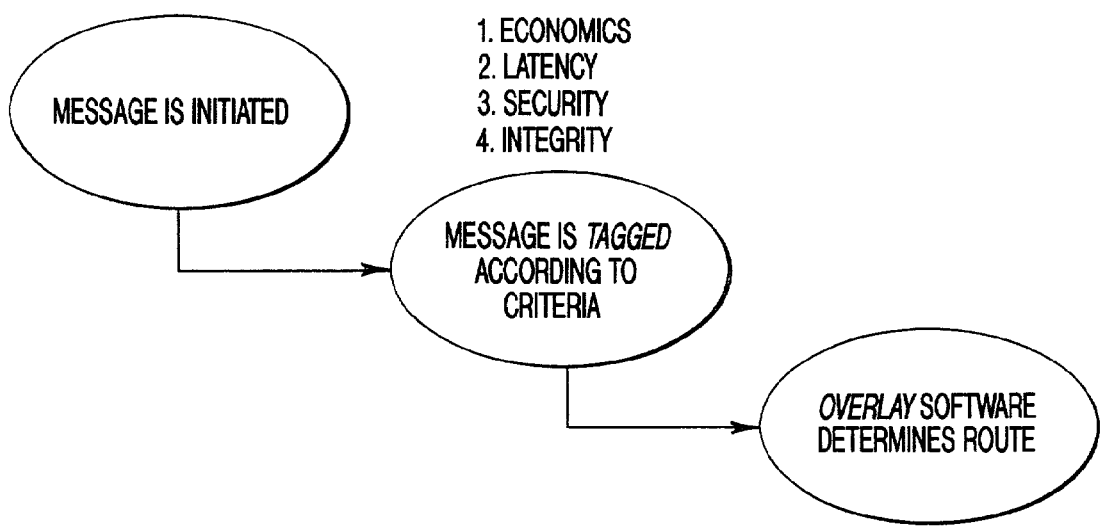
FIG. 2 shows the method for the present invention.

The method in accordance with my invention of provides the user with the ability to choose various digital routes based on his particular needs at any given time. FIG. 2 graphically portrays the general concept of my invention, which can be compared to the existing model described in FIG. 1. To accomplish the decision making required, proprietary software comprising simple look-up tables and key algorithms defined by the customer is introduced. "Overlay software" is the name given to this proprietary software installed at any site where a communication is initiated. This software contains the commands and algorithms needed to choose the appropriate media route. "Tagged" is the term used to define the process of adding software coding to an individual message that defines priority of a specific message. Once a message is Tagged, the Overlay software can determine the most appropriate route. (see FIG. 3). My method for digital signal route determination addresses the problems of the past by installation of Overlay software anywhere a message is initiated, whether that is on a vehicle, user initiation facility, or government control facility. FIG. 4 demonstrates how the sequence will work. This Overlay software is capable of choosing:

the most economic route (step 1);
the fastest (latency) route if required (step 2);
the most secure route if required (step 3); and/or
the route that affords the highest integrity (step 4).

Thus the Overlay software advantageously comprises one or more of look up tables, algorithmic calculation and real-time information or cost, available DSP route, and DSP route status information. Further, the real-time information is advantageously updated, as by time bases updates or by querying a DSP provided. For message prioritization, my method allows the user to leverage all existing routes, and through unique algorithms, choose the most appropriate route based on a pre-determined hierarchy of needs (see steps 1–4 in FIG. 4). This hierarchy of needs (steps 1–4) can be adjusted for each potential user of my DSRD method. As a simplistic example, each of the four criteria (steps 1–4) might be weighted using a scale of 1–10, with 1 being of minimal importance and 10 being most important. Each user then defines the priority of each criteria that user wants to assign to each type of message. The number and complexity of prioritization are primarily dependent on two factors: first, the complexity and quantity of different messages the user needs to send; and, second, on the number of available routes the software will be able to choose from. The actual weighting of priorities is negotiated with each customer according to their unique needs. The step of closing the DSP route could be performed at a vehicle, a user installation facility, or a government control facility.

Figure 5:
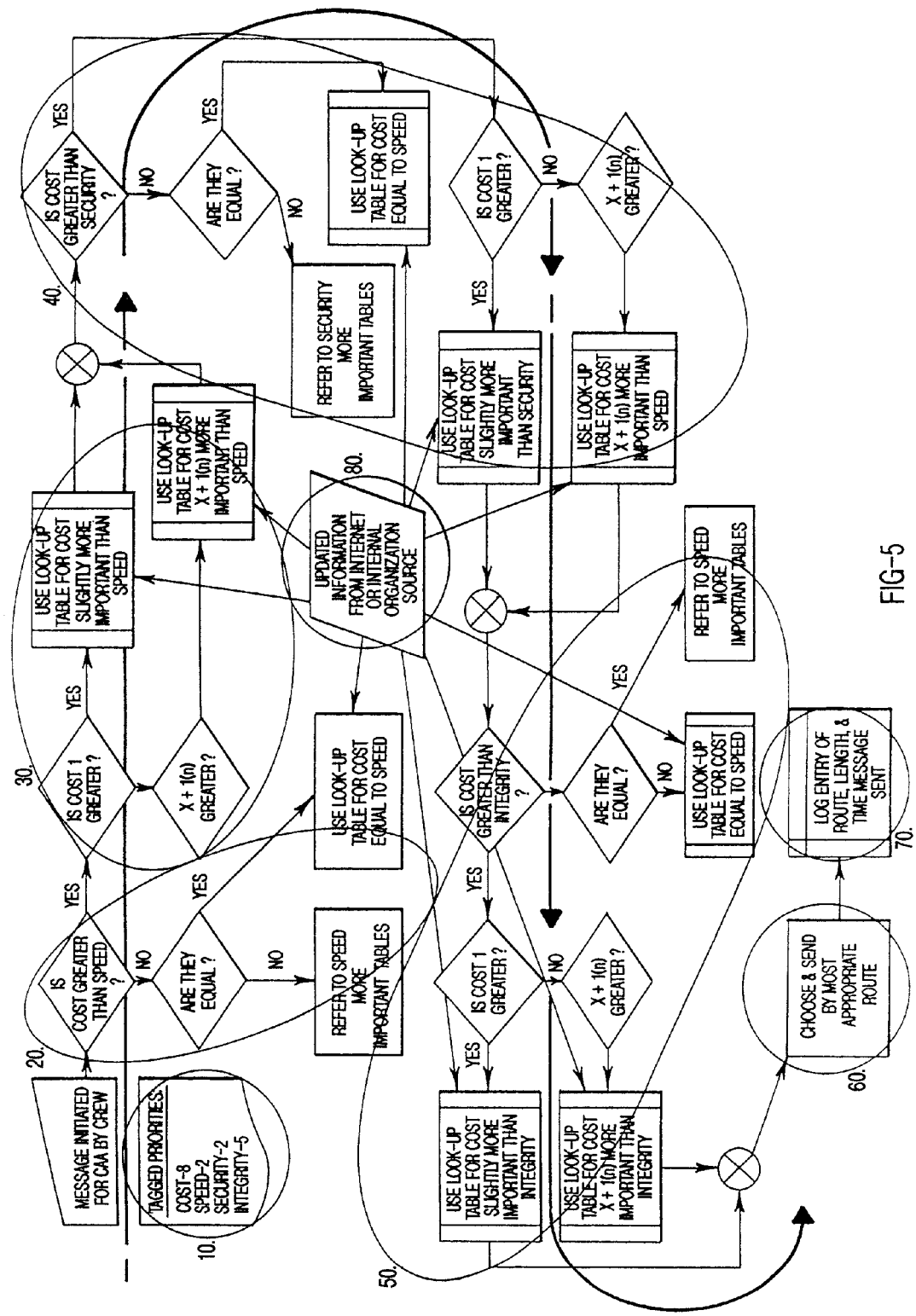
FIG. 5 shows an example of the preferred overlay process in accordance with my invention.

FIG. 5 is offered as an example of how the process will work. In this example the "customer" has defined cost as the highest priority. Each message type will preferably be Tagged, step 10, when it is created so that the Overlay software, steps 20–50, can determine the priorities that are applicable and then choose an appropriate route, step 60. The Tagging of a message, step 10, can be accomplished in a variety of ways. These include a simple manual input from the user, automatically based on where it originates or how it is created. The updating of the information used in the tables and algorithms is also shown, step 80.

Figure 3:
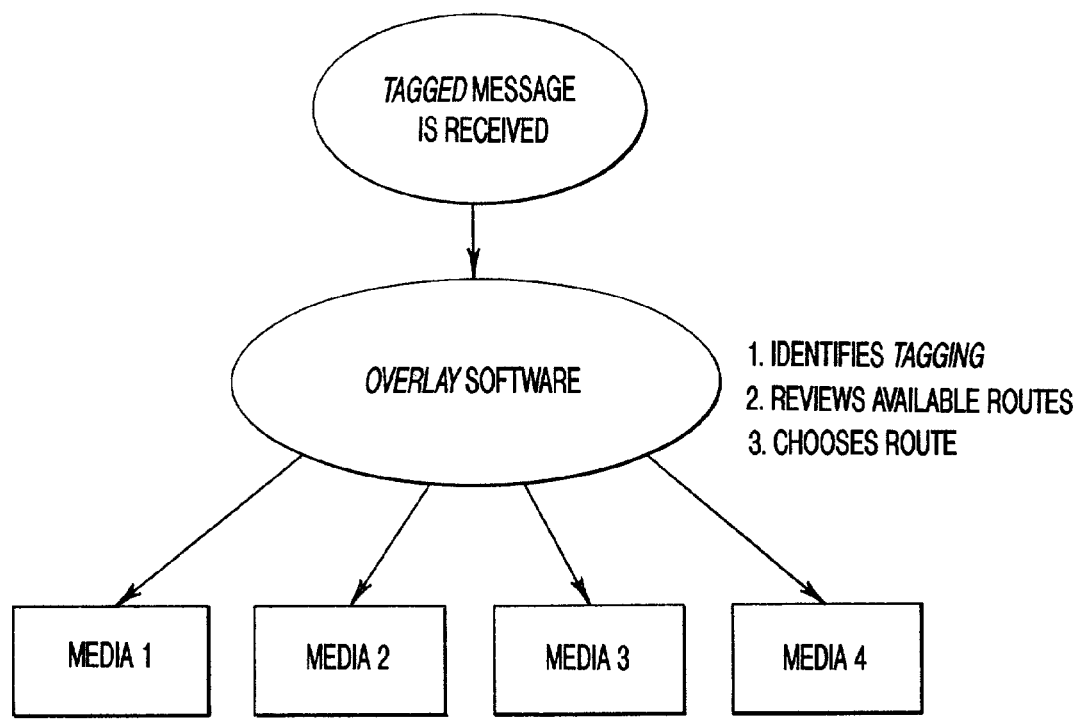
FIG. 3 depicts the use of overlay software in accordance with an aspect of my invention.
Figure 4:
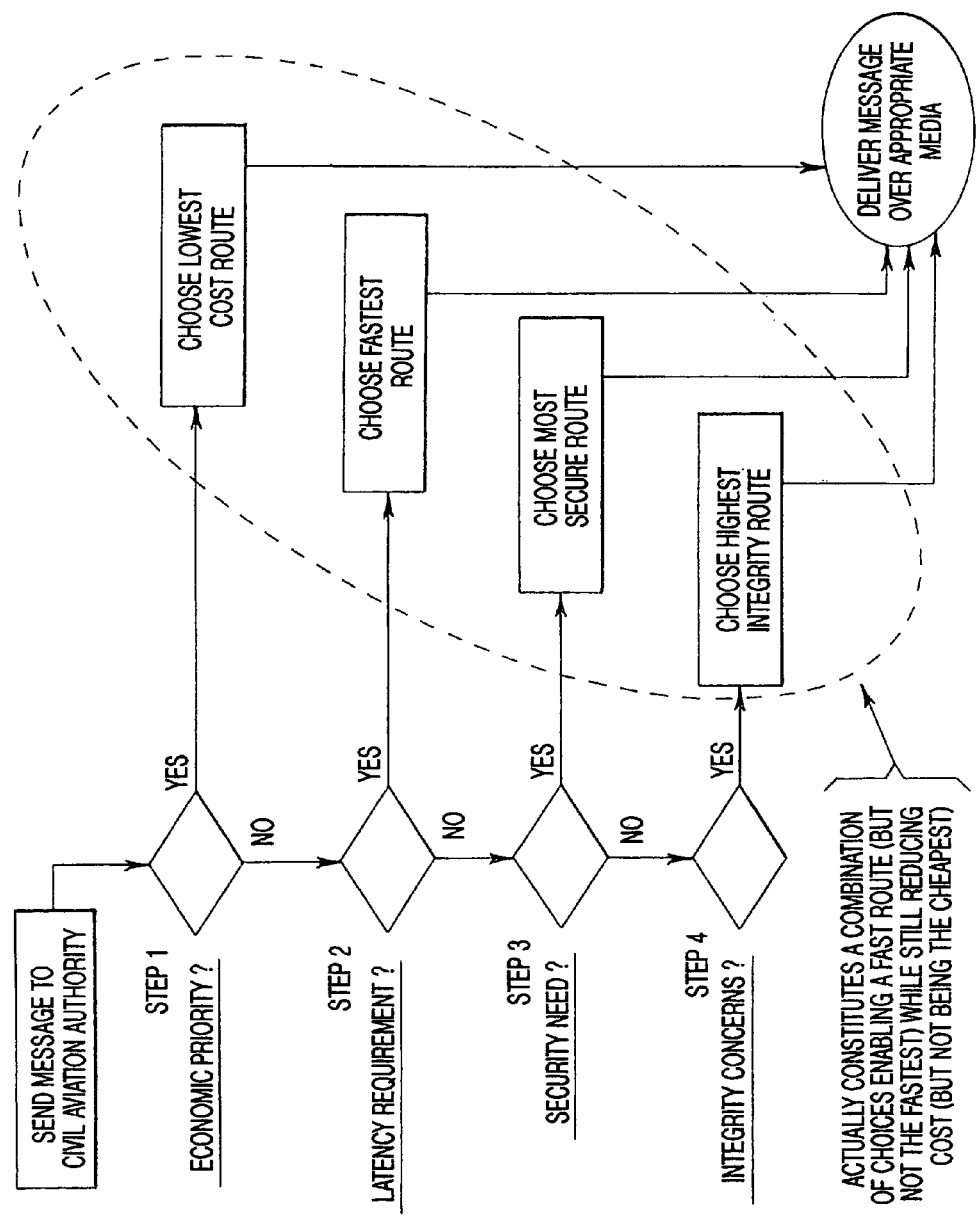
FIG. 4 demonstrates the concept of the preferred decision making process.

In real use, the Overlay software for my DSRD method will use a combination of lookup tables and real or near-real time information on cost, available routes, and route status updates from the DSPs to determine which route is most appropriate for any given message (see FIGS. 3, 4 & 5). Updates to rates and/or system status can be provided in various ways, from a time-based method to an aircraft power-up method to a real time, in-air update as a message is sent (not shown). Primarily the user community and the DSPs will determine the update need as the number of digital messages and competition increases, and integrity and latency begin to have added impact to the user. The model is defined in such a way as to evolve to accommodate any or all of the potential update solutions, as they are needed.

A time-based update assumes that changes will occur on a predetermined, scheduled basis. For example, monthly each vehicle participating in the use of my DSRD method would be provided with the latest rates and status of the actual system. For example, a Ground Earth Station (GES)

might be down for repair or a new one may have come on-line. On the other end of the update spectrum, a vehicle would query each provider to determine the best instantaneous rate given the aircraft position when it desires to send a message. In this case, the method would determine the most appropriate route based on the newly up-linked or downloaded rate structure. This method would also enable a simplified auction for service, i.e. the user could allow each provider to bid for the service in near real time.

If desired, for certain messages, the user could establish a predetermined rate. If this rate were not met, the message would not be sent until the vehicle arrived at a location where the service could be provided at the predetermined cost. An intermediate solution might function in a manner such that when the vehicle powers up, it would initiate a status message querying the system to compare current information on-board with the master database. If the master database detects out of date rates it would automatically download the current rate structure.

Included in my method is an accounting infrastructure whereby the DSPs would bill the system controller who would then bill the respective users on a periodic basis (or as negotiated). Part of the purpose of the Overlay software is to count the number and addresses of sent messages to enable verification of service use (see step 70 in FIG. 5). The only way this type of accounting is accomplished today is to have the operator manually note the time, date, and address of a message as it is sent. There are few vehicle operations that have the luxury of allocating the time to track accurately digital messages. Certainly in the future, this will become even less likely as numerous status messages are envisioned to be sent automatically. My DSRD method not only provides for consolidated billing, but will also ensure accuracy by enabling user tracking even though it is likely that traffic will be sent over multiple DSP networks.

It is possible to take one priority such as economics and choose message routing based entirely upon this single criterion. The method of my invention would still work, just not provide as many advantages to the user. From the same perspective, it is possible to have two criteria or three without all four and still be useful.

My DSRD method also has potential uses outside of the aviation industry. Literally, any wireless communication usage could benefit from my invention as a way to enhance economics, latency, security, integrity or combinations of these criteria. The invention is applicable wherever digital messages or information are sent where there is more than one potential route that the message/information can be sent over and each route potentially has a different cost. An example might be the need to identify a hierarchy for messages sent on a battlefield. The present invention can be used for any digital message transmitted to another party, such as cell phones, existing telephone lines, other transportation industries (bus, rail, truck, taxi, etc.). There is no question that latency and security are key elements of the modern battle. Another example might be ground transportation networks that have a business need to minimize cost while still considering critical messages that will affect efficiency.

The method of my invention can be further illustrated by considering that on a flight from New York to Frankfort, Germany, an airliner receives a digital message requesting a deviation from their planned route of flight to avoid an aircraft traveling from Miami to Boston. Since the potential for a midair collision would exist if neither airliner makes a change to their route of flight, this becomes a priority message where speed is most important. The proprietary software would tag the message as a speed or latency priority and subsequently send the message over the most expedient route (the example in FIG. 5 is applicable with the exception that cost and latency flip flop in importance). In this example, both airliners are inside of line-of-site range allowing the use of a Very High Frequency (VHF) message. For this reason, the proprietary software chooses to send the message over a VHF route. Two SATCOM networks are available at comparable delivery speeds but at greater cost. The message is sent acknowledging receipt of the original request and notifying Air Traffic Control (ATC) that the air liners will make the requested deviation. At the same time that the message is sent, the proprietary software stores the time, location, length of message, and routing for future accounting purposes. When ATC confirms that the transoceanic airliner will deviate, they also request notification of any significant weather encountered by the airliner. Since the airliners acknowledgment of the message is no longer a priority, the proprietary software tags the message with the appropriate low priority (the example in FIG. 5 is appropriate but now cost again becomes the priority since time is no longer an issue). The proprietary software then sends the message over a SATCOM network because it is the only available route (as the New York to Frankfort plane has continued eastward during the example, it has moved out of not only VHF coverage but also the second SATCOM coverage area). In this case, even though cost was the priority there was only one route available for use so the Overlay software chose that route. As in the first response, the proprietary software stores location, time, length of message, and route for future accounting purposes.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. A method for selecting a Datalink Service Provider route for each individual digital message, the method comprising the steps of:
   a) attaching a unique prioritization tag to the each individual digital message based on factors provided by Datalink Service Providers, the unique prioritization tag comprising user chosen routing priority criteria selected from the factors;
   b) supplying the prioritized criteria from the user to an overlay software;
   c) automatically choosing the Datalink Service Provider route by evaluating the prioritized criteria in the overlay software; and
   d) routing the each individual digital message through the chosen Datalink Service Provider route.

2. The method of claim 1 further comprising the step of tracking the chosen Datalink Service Provider route for accounting purposes.

3. The method of claim 2 further comprising the step of preparing a billing record of the chosen Datalink Service. Provider route.

4. The method of claim 1 further comprising repeating steps a) through d) for a next user.

5. The method of claim 1 further comprising repeating steps a) through d) for a next digital message.

6. The method of claim 1 wherein the step of choosing a Datalink Service Provider route is performed at a member of the group consisting of a vehicle, a user initiation facility, and a government control facility.

7. The method of claim 1 wherein the step of attaching a unique prioritization tag comprises attaching a manual tag.

8. The method of claim 1 wherein the step of attaching a unique prioritization tag comprises attaching an automatic tag.

9. The method of claim 1 wherein said overlay software comprises at least one of the following:
   lookup tables;
   logarithmic calculations and real-time information on cost;
   available Datalink Service Provider routes; and
   Datalink Service Provider route status information.

10. The method of claim 9 further comprising the step of updating the real-time information.

11. The method of claim 10 wherein the step of updating comprises time-based updates.

12. The method of claim 10 wherein the step of updating comprises querying at least one Datalink Service Provider.

13. An avionics routing method for an individual digital message, the method comprising the steps of:
   a) attaching a unique prioritization tag to the individual digital message based on factors provided by at least two Datalink Service Providers, the unique prioritization tag comprising user chosen routing priority criteria selected from the factors;
   b) supplying the priority criteria from the user to an overlay software;
   c) evaluating the priority criteria by the overlay software;
   d) automatically choosing a Datalink Service Provider route from the at least two Datalink Service Provider service providers by the overlay software; and
   e) transmitting the individual digital message through the chosen Datalink Service Provider route.

14. The method of claim 13 further comprising the step of tracking the chosen Datalink Service Provider route for accounting purposes.

15. The method of claim 13 further comprising repeating steps a) through e) for a next digital message.

16. The method of claim 13 wherein said overlay software comprises at least one of the following:
   lookup tables;
   logarithmic calculations and real-time information on cost;
   available Datalink Service Provider routes; and
   Datalink Service Provider route status information.

17. The method of claim 1 wherein said prioritized criteria comprises at least one of the following criteria:
   a) cost of sending the digital message;
   b) speed of delivery of the digital message:
   c) security of the digital message; and
   d) integrity of the digital message.

18. The method of claim 13 wherein said prioritized criteria comprises at least one of the following criteria:
   a) a cost of sending the digital message;
   b) speed of delivery of the digital message;
   c) security of the digital message; and
   d) integrity of the digital message.

* * * * *